(12) United States Patent
Keller

(10) Patent No.: US 7,458,338 B2
(45) Date of Patent: Dec. 2, 2008

(54) ANIMAL FEEDER APPARATUS

(75) Inventor: Adam J. Keller, Neenah, WI (US)

(73) Assignee: Adam's Specialty Products, LLC, Neenah, WI (US)

( * ) Notice: Subject to any disclaimer, the term of this patent is extended or adjusted under 35 U.S.C. 154(b) by 231 days.

(21) Appl. No.: 11/388,165

(22) Filed: Mar. 22, 2006

(65) Prior Publication Data

US 2006/0162669 A1    Jul. 27, 2006

Related U.S. Application Data

(63) Continuation-in-part of application No. 10/837,872, filed on May 3, 2004, now Pat. No. 7,055,462.

(51) Int. Cl.
*A01K 5/01* (2006.01)
*A01K 39/01* (2006.01)
*A01K 31/06* (2006.01)

(52) U.S. Cl. ............ 119/475; 119/462; 119/477; 119/452; 119/464; 119/469; 119/51.01; 119/61.5; 119/61.51; 119/61.57

(58) Field of Classification Search ............ 119/51.01, 119/52.1, 52.2, 57.8, 61.3, 61.5, 61.51, 61.57, 119/63, 416, 417, 429, 452, 454, 456, 457, 119/459, 462, 464, 467, 475–478, 484, 515, 119/521

See application file for complete search history.

(56) References Cited

U.S. PATENT DOCUMENTS

| 357,493 | A | 2/1887 | McWilliams |
|---|---|---|---|
| 562,853 | A | 6/1896 | Rooker |
| 623,360 | A | 4/1899 | Foster |
| 1,159,540 | A | 11/1915 | Smith |
| 1,602,000 | A | 10/1926 | Custer |
| 1,694,082 | A | 12/1928 | Sheehy |
| 1,705,154 | A * | 3/1929 | Gill .................. 119/63 |
| 1,719,769 | A | 7/1929 | Kaufman |
| 1,832,999 | A | 11/1931 | Rummel |
| 1,869,901 | A | 8/1932 | LeFever |
| 1,900,868 | A | 3/1933 | Ritchie |
| 2,031,874 | A | 2/1936 | Butler et al. |
| 2,970,566 | A | 2/1961 | Detrick |
| 2,997,022 | A | 8/1961 | Kay |
| 3,100,474 | A | 8/1963 | Schneider |
| 3,251,342 | A * | 5/1966 | Kay .................. 119/475 |

(Continued)

FOREIGN PATENT DOCUMENTS

GB    1213971    11/1970

(Continued)

*Primary Examiner*—Michael R Mansen
*Assistant Examiner*—Joshua J Michener
(74) *Attorney, Agent, or Firm*—Thomas J. Connelly; Wilhelm Law Service

(57) ABSTRACT

A feeder apparatus comprises a plurality of walls defining a feeder body, mounting structure, and a feed holder. The feeder body is hingedly, optionally hingedly and/or removably, mounted to the mounting structure. In some embodiments, the feeder apparatus further includes a blocking plate which is hingedly, optionally hingedly and removably, mounted to the mounting structure. One or more of the feeder body walls and the feed holder have cooperating sliding structures, enabling the feed holder to be slidingly received into, and/or removed from the remainder of the feeder apparatus.

20 Claims, 11 Drawing Sheets

U.S. PATENT DOCUMENTS

| | | |
|---|---|---|
| 3,361,116 A | 1/1968 | Daniel et al. |
| 3,554,165 A * | 1/1971 | Carter .................. 119/477 |
| 3,919,977 A | 11/1975 | Clark |
| 4,574,738 A * | 3/1986 | Tominaga ............. 119/464 |
| 4,798,170 A * | 1/1989 | DePiazzy ............. 119/61.57 |
| 5,072,071 A * | 12/1991 | Cassity et al. .......... 174/660 |
| 5,152,247 A | 10/1992 | Brown |
| 5,435,266 A | 7/1995 | Carson |
| 5,511,332 A | 4/1996 | Sturkie et al. |
| 5,950,567 A | 9/1999 | Sheaffer et al. |
| 5,957,087 A | 9/1999 | Bonder et al. |
| 6,199,510 B1 | 3/2001 | Louden |
| 6,550,832 B2 | 4/2003 | McHenry et al. |
| 6,748,898 B2 | 6/2004 | Ulman et al. |
| 6,832,580 B2 | 12/2004 | Marchioro |
| 2003/0047293 A1 | 3/2003 | Lee |
| 2003/0177699 A1 | 9/2003 | Fukuro et al. |
| 2004/0144330 A1 | 7/2004 | Marchioro |

FOREIGN PATENT DOCUMENTS

| | | |
|---|---|---|
| GB | 1348875 | 3/1974 |
| GB | 2258683 | 2/1993 |
| GB | 2310240 | 8/1997 |
| WO | WO9612863 | 5/1996 |

* cited by examiner

ANIMAL FEEDER APPARATUS

CROSS-REFERENCE TO RELATED APPLICATION

This application is a Continuation-in-Part application claiming priority under 35 U.S.C. 120 to U.S. application Ser. No. 10/837,872, filed May 3, 2004, now U.S. Pat. No. 7,055,462 issued on Jun. 6, 2006.

BACKGROUND

The present invention relates to feeder apparatus, i.e. feeding devices for providing food, water, dietary supplements, and other forms of sustenance or medicines to pets and/or other animals, housed in confine. Animal owners/caretakers house some animals e.g. birds, reptiles, rodents, mammals and other relatively common animals and/or relatively exotic animals, in the confines of a physical enclosure. Common physical enclosures used to house animals include rigid wire cages, tension wire cages, Plexiglas® acrylic enclosures, and others.

Animals require regular access to food, water, dietary supplements, and other forms of sustenance or medicines (hereinafter referred to as foodstuff) while housed in confine. Methods of distributing foodstuff, and the structure of apparatus adapted to distribute foodstuff varies as dictated by animal species in confine.

As one example, confined non-flight animals, e.g. reptiles, rodents, mammals and other animals which move about by generally non-flight means, can be fed via feeding devices located on the floor of the confining physical enclosure. Accordingly, non-flight animals are frequently administered foodstuff via feeding devices, e.g. bowls, troughs and other devices, which sit on the floor of the confining physical structure (hereinafter also referred to as "cage").

As another example, confined flight animals, e.g. bird and/or other animals which enjoy perching elevated above the floor of the confining physical enclosure, may prefer consuming foodstuff at an elevated location. Accordingly, some flight animals are administered foodstuff via feeding devices which are elevated above the floor of the confining physical structure. Often, the feeding devices are attached to an inside wall of the confining physical structure so as to present foodstuff to the confined animal at an elevated level.

An animal owner/caretaker must routinely perform maintenance tasks to ensure the health of the confined animal. Some routine maintenance tasks include reaching inside the confining physical structure to fill the feeding devices with foodstuff, and/or to clean/maintain the feeding devices. In the alternative, the animal owner/caretaker must routinely reach inside the confining physical structure, to remove the feeding devices, in order to fill the feeding devices with foodstuff, and/or to clean/maintain the feeding devices outside of the confines of the physical structure.

In some situations, the animal owner/caretaker may prefer to not reach inside the confining physical structure while performing the aforementioned maintenance tasks. For example, some animals kept in confinement are dangerous and/or deadly. An animal owner/caretaker may prefer to avoid reaching inside of the confining physical structure with a dangerous and/or deadly animal. As another example, some confined animals are relatively quick and/or agile and thus may be relatively more prone to escape. An animal owner/caretaker may prefer to avoid reaching inside of the confining physical structure, and thus providing an opportunity for a relatively quick and/or agile animal to escape.

Some known feeding devices are accessible to the animal owner/caretaker from outside of the confining physical structure. Conventional feeding devices of this type mount to a side wall of the confining physical structure. Typically, these feeding devices have at least one part which can be pivoted into and out of the interior of that confining physical structure thus to provide access to the feeding device from outside the confining structure.

However, many confined animals pick at, scratch at, bite at, or otherwise disturb objects inside of their confining physical structure, including parts of a feeding device. Accordingly, parts of a feeding structure which pivot inside of a confining physical structure are often subject to such animal induced abuse, and thus experience more damage, and quicker wear than parts of the feeding structure which remain on the outside of a confining structure. In addition, picking at, scratching at, biting at, or otherwise disturbing parts of a feeding device inside of a confining physical structure can cause injury to the animal or damage to the feeding structure which may enable the animal to escape.

Now, a feeder apparatus has been invented which provides a safe and efficient device for feeding an animal housed in a cage.

SUMMARY

Feeder apparatus comprises a plurality of walls defining a feeder body, mounting structure, and a feed holder. The feeder body is hingedly, optionally hingedly and/or removably, mounted to the mounting structure. In some embodiments, the feeder apparatus further includes a blocking plate which is hingedly, optionally hingedly and/or removably, mounted to the mounting structure. One or more of the feeder body walls and the feed holder have cooperating sliding structures, enabling the feed holder to be slidingly received into, and/or removed from the remainder of the feeder apparatus.

When feeder apparatus of the invention is mounted to a cage wall, one mounting flange in located inside of the cage. The remaining structure of the feeder apparatus is located outwardly of the cage, thereby enabling an animal owner/caretaker to access the feeder apparatus without having to open the cage. The hinged, removable attachment of ones of the feeder body and blocking plate to the mounting structure enable a user to perform various tasks to the feeder body and/or blocking plate, including, but not limited to, cleaning, repairing, replenishing, and/or others.

In a first family of embodiments, the invention comprehends a feeder apparatus, for mounting to a cage, comprising: (a) mounting structure connected to the cage; (b) a feeder body comprising a plurality of walls connected to each other and defining an inner space generally surrounded by the walls, the feeder body operatively communicating with the mounting structure and located generally outside the cage; (c) a hinge assembly connecting the mounting structure and the feeder body; and (d) a feed holder extending downwardly from the feeder body and slidingly housed therein; the hinge assembly hingedly attaching the feeder body to the mounting structure such that the feeder body hingedly actuates outside of the cage, the portion of the feed holder most proximate the cage being displaced from the cage by a distance which has a magnitude less than the magnitude of the length dimension of the feed holder.

In some embodiments, the feed holder is removably housed in the feeder body.

In some embodiments, the feeder body is selectively removable from the remainder of the feeder apparatus.

In some embodiments, at least one of the walls comprises receiving structure adapted and configured to receive a portion of the feed holder therein.

In some embodiments, the feed holder comprises at least one lateral guide extending therefrom, the lateral guide being received by the receiving structure of the at least one of the walls.

In some embodiments, the invention further includes a feed holder locking mechanism, the feed holder locking mechanism communicating with each of the feeder body and the feed holder, the feed holder locking mechanism being adapted to generally restrain the feed holder relative to the feeder body, thereby to prevent unintended removal of the feed holder from the feeder body.

In some embodiments, the hinge assembly comprises first and second hinge members, the first hinge member mounted to the mounting structure and the second hinge member mounted to the feeder body.

In some embodiments, the first and second hinge members are snap lockingly connected to each other.

In a second family of embodiments, the invention comprehends a feeder apparatus, for mounting to a cage with a plurality of sidewalls and a floor, comprising: (a) mounting structure connected to the cage; (b) a feeder body comprising a plurality of walls connected to each other and defining an inner space generally surrounded by the walls, the feeder body operatively communicating with the mounting structure and located generally outside the cage; and (c) a hinge assembly removably connecting the mounting structure and the feeder body and enabling the feeder body to pivotably actuate with respect to the mounting structure.

In some embodiments, the hinge assembly comprises first and second hinge members, the first hinge member mounted to the mounting structure and the second hinge member mounted to the feeder body.

In some embodiments, the first and second hinge members are snap lockingly connected to each other.

In some embodiments, the invention further includes a latch assembly adapted and configured to provide an interface between the mounting assembly and the feeder body.

In some embodiments, the latch assembly comprises first and second latch members, the first latch member mounted to the mounting structure and the second latch member mounted to the feeder body.

In some embodiments, the first latch member comprises a latch projection extending outwardly from the mounting structure and the second latch member comprises a latch tab which extends outwardly from the an outer surface of the feeder body.

In some embodiments, the latch assembly is adapted and configured to enable a user to selectively secure the feeder body in a generally closed position in which the feeder body is positioned against the mounting structure.

In some embodiments, the mounting structure comprises a first flange having a first perimeter defining a first opening extending through the first flange, and a second flange having a second perimeter defining a second opening extending through the second flange.

In some embodiments, at least one of the first and second flanges has a protrusion extending therefrom and adapted to communicate with the other of the first and second flanges.

In a third family of embodiments, the invention comprehends a feeder apparatus, for mounting to a cage, comprising: (a) mounting structure connected to a wall of the cage and defining an opening therethrough; (b) a feeder body which includes first and second lateral walls and a top wall, the first and second lateral walls connected to the top wall; (c) a blocking plate adapted and configured to cover such opening of the mounting structure and to generally prevent an animal from passing therethrough; and (d) a feed holder removably housed in the feeder body; at least one of the feeder body and the blocking plate hingedly attached to the mounting structure, the feeder body and the blocking plate cooperating with the remainder of the feeder apparatus such that at most one of the feeder body and the blocking plate covers such opening of the mounting structure at any given time.

In some embodiments, the feeder body is removably attached to the mounting structure.

In some embodiments, the blocking plate is removably attached to the mounting structure.

It is an object of this invention to provide an animal feeding device for mounting to a cage which enables a user to perform various tasks such as clean, repair, or replenish the feeder while avoiding reaching inside the cage, and whilst mitigating the likelihood of the animal's escape from such cage.

It is an object of this invention to provide an animal feeding device which mounts to the exterior of a confining physical structure.

It is a more specific object to provide an animal feeding device which enables a user to avoid reaching inside an animal confining physical structure while the user performs feeding related maintenance tasks.

It is yet another object to provide an animal feeding device which enables a user to selectively prevent an animal from leaving the confining physical structure through the animal feeding device, while the user performs feeding related maintenance tasks.

Other objects and advantages of the present invention will become more apparent to those skilled in the art in view of the following description and the accompanying drawings.

Figure 1A:
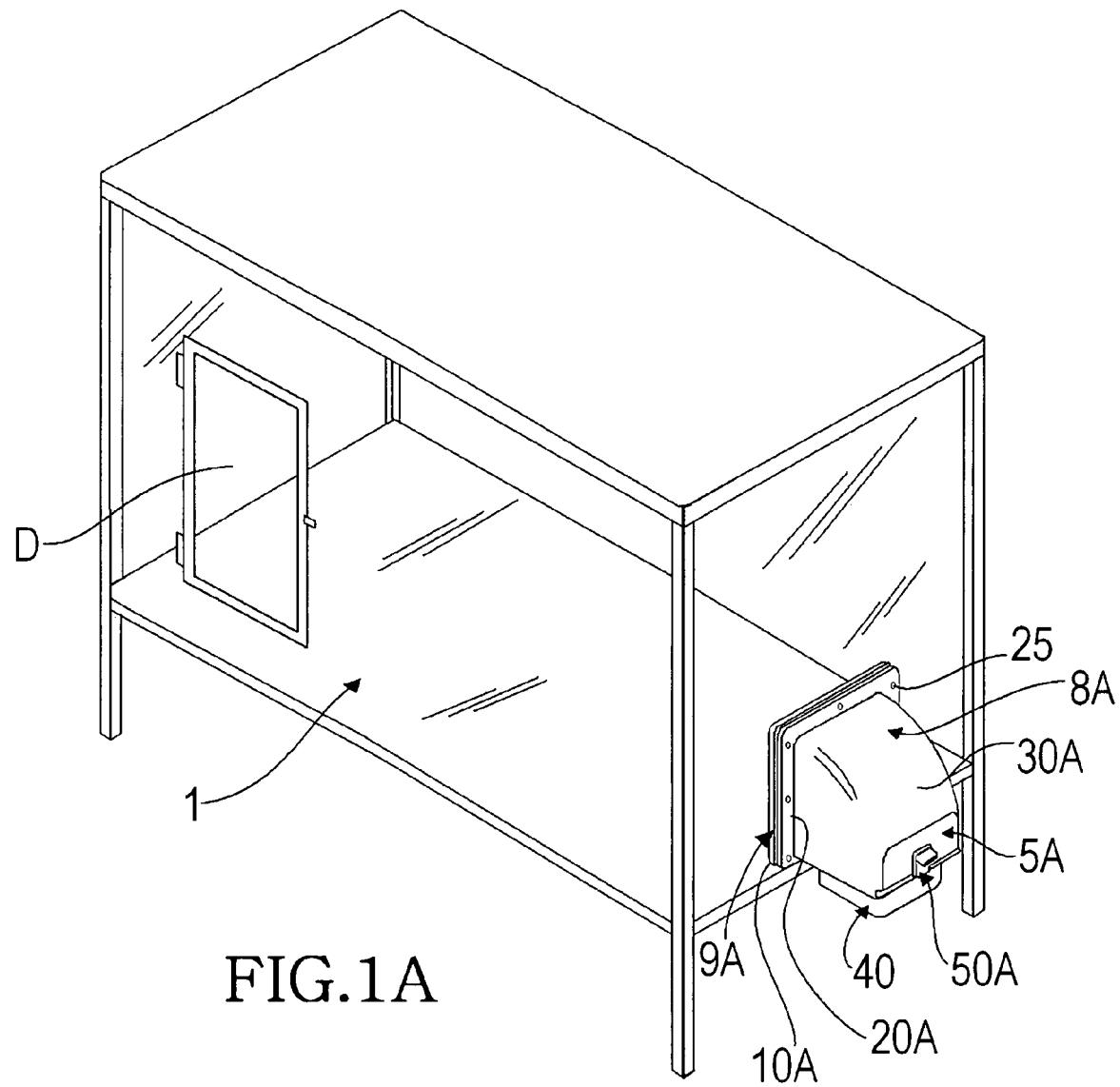
FIG. 1A shows a perspective view of a first embodiment of feeder apparatus of the invention installed on an animal confining physical enclosure.

The invention is not limited in its application to the details of construction or the arrangement of the components set forth in the following description or illustrated in the drawings. The invention is capable of other embodiments or of being practiced or carried out in other various ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

FIG. 1A illustrates confining physical structure, e.g. cage 1, equipped with a first embodiment of feeder apparatus 5A of the invention. Feeder apparatus 5A of the invention is used to provide food, water, dietary supplements, and other forms of sustenance or medicines to pets and/or other animals, housed in the confine of cage 1.

Figure 1B:
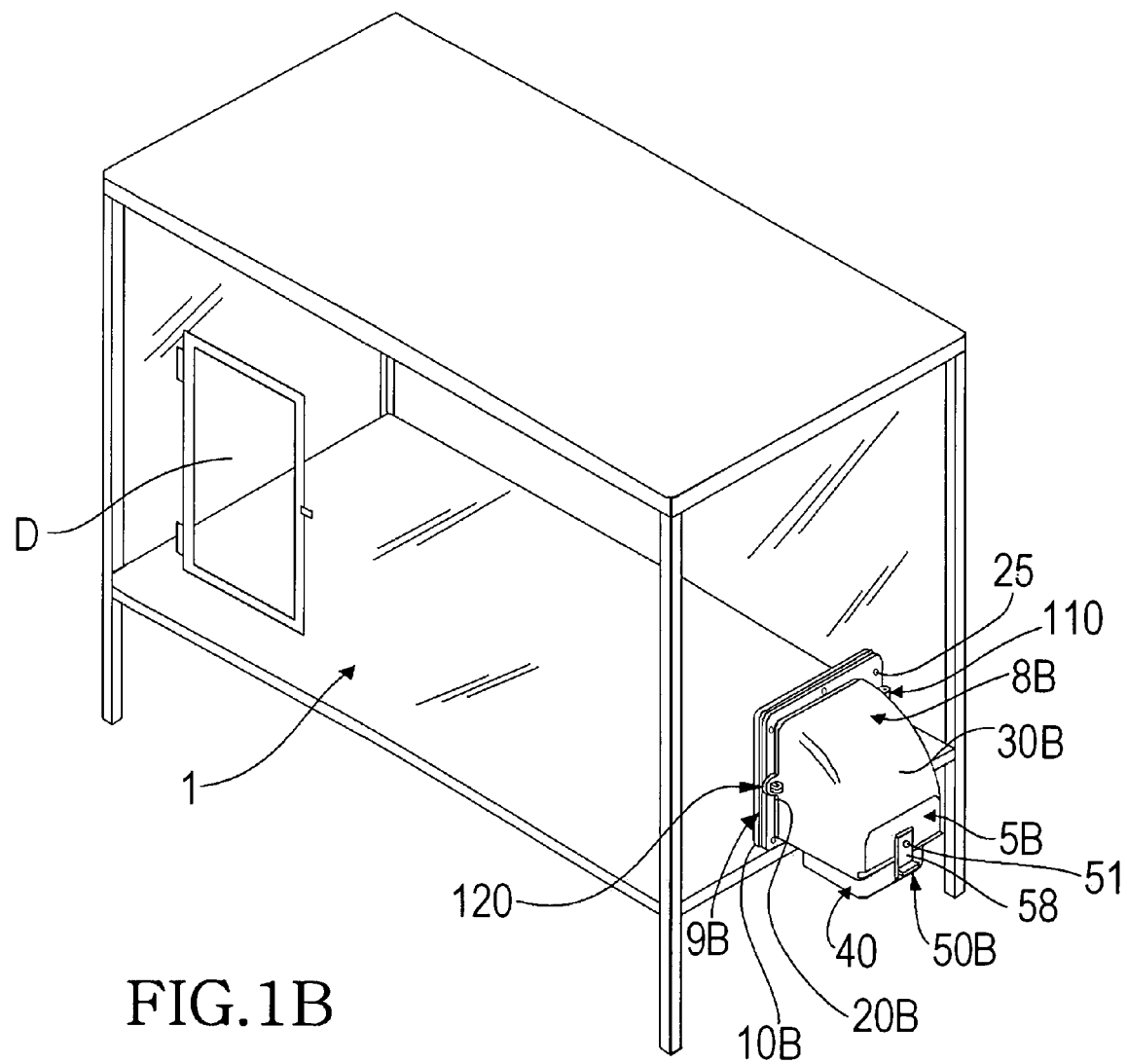
FIGS. 1B and 1C show perspective views of the embodiment of FIG. 1A wherein the feeder apparatus, or a block plate, are hingedly mounted to the cage.

In general, referring to FIGS. 1A and 1B, cage 1 is an enclosed structure for housing animals, e.g. birds, reptiles, rodents, mammals and other relatively common animals and/or relatively exotic animals. Cage 1 has a bottom wall, a top wall, and a plurality of side walls (none labeled).

Implementations of feeder apparatus 5A, 5B of the invention include a main body portion, mounting structure, and a container, e.g. feeder body 8A, 8B, mounting structure 9A, 9B, and feed holder 40, respectively. In some embodiments, feeder apparatus 5A further comprises blocking plate 49A (FIG. 9), 49B (FIGS. 1C and 10) and/or a locking mechanism 50A (FIG. 1A) or 50B (FIG. 1B). As desired, various components of feeder apparatus 5A, 5B are hingedly, pivotably, slidably, removably, and/or otherwise attached to or communicate with, other various components thereof.

In other words, feeder apparatus 5A, 5B and/or the various components thereof are actuatable, or otherwise moveable. The actuatable or movable functionality of ones of the various components of feeder apparatus 5A, 5B enables a user to perform various animal maintenance and/or other caretaking tasks whilst avoiding reaching inside a confining or housing structure which houses such an animal therein.

Namely, as desired and by way of various ones of the components of feeder apparatus 5A, 5B such as blocking plates 49A (FIG. 9), 49B (FIG. 1C), a user can physically block the animal inside the cage during e.g. removal of feed holder 40 and/or feeder body 8A, 8B from the remainder of the feeder apparatus. This prevents the animal from escaping through the feeder apparatus during various animal caretaking activities. All uses and manipulations, maneuvers, operations of feeder apparatus 5A, 5B, are performed by the user whilst the user is outside of cage 1, mitigating the exposure of the user to the confined animal.

Feeder apparatus 5A and 5B have mounting structures 9A and 9B. Each of mounting structures 9A and 9B typically comprises corresponding pairs of mounting flanges e.g. flange 10A and flange 20A, flange 10B, 20B, or others. Flanges 10A, 10B, 20A, and 20B are adapted to be used to mount feeder apparatus 5A to cage 1.

Figure 1C:
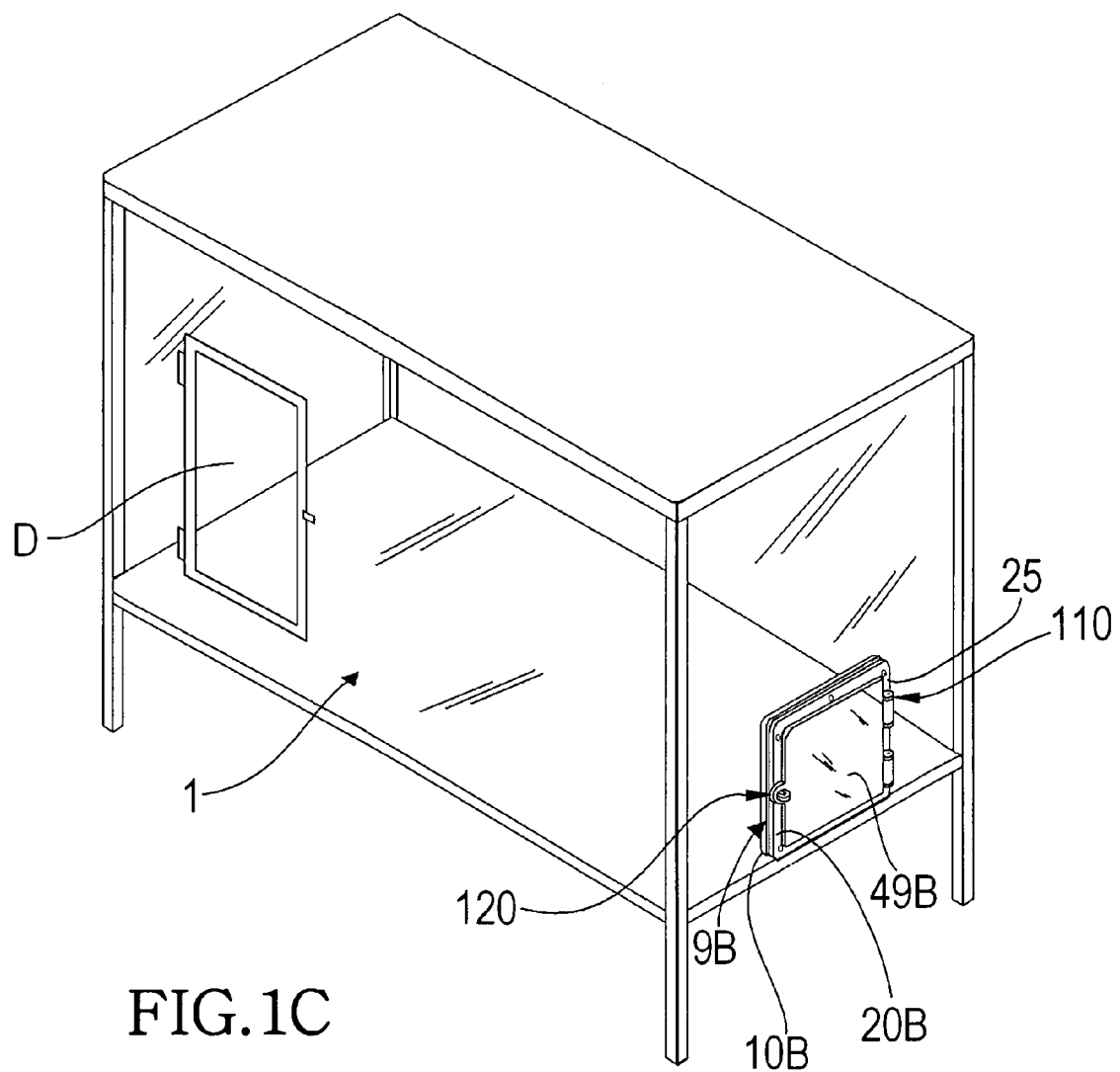
Figure 2:
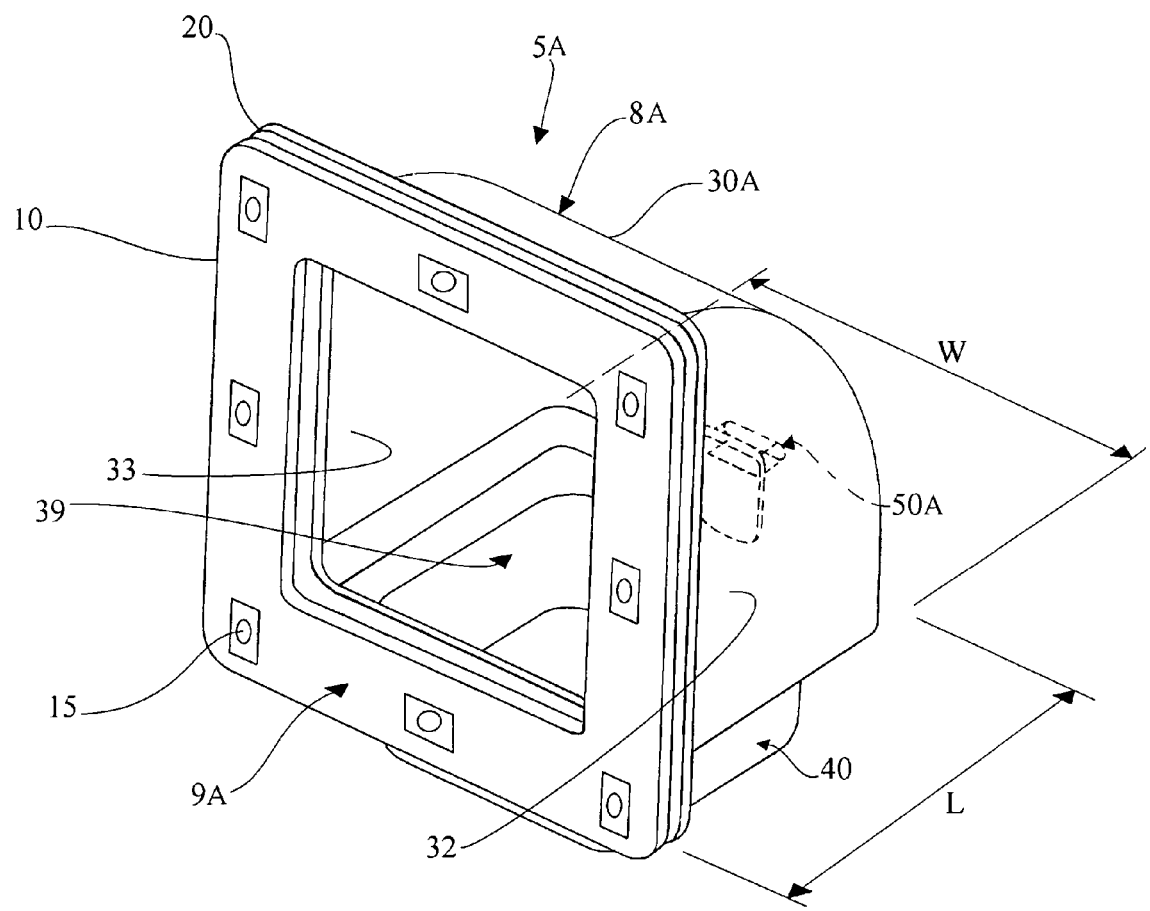
FIG. 2 shows a perspective view of the feeder apparatus of FIG. 1, removed from the animal confining physical enclosure.
Figure 3A:
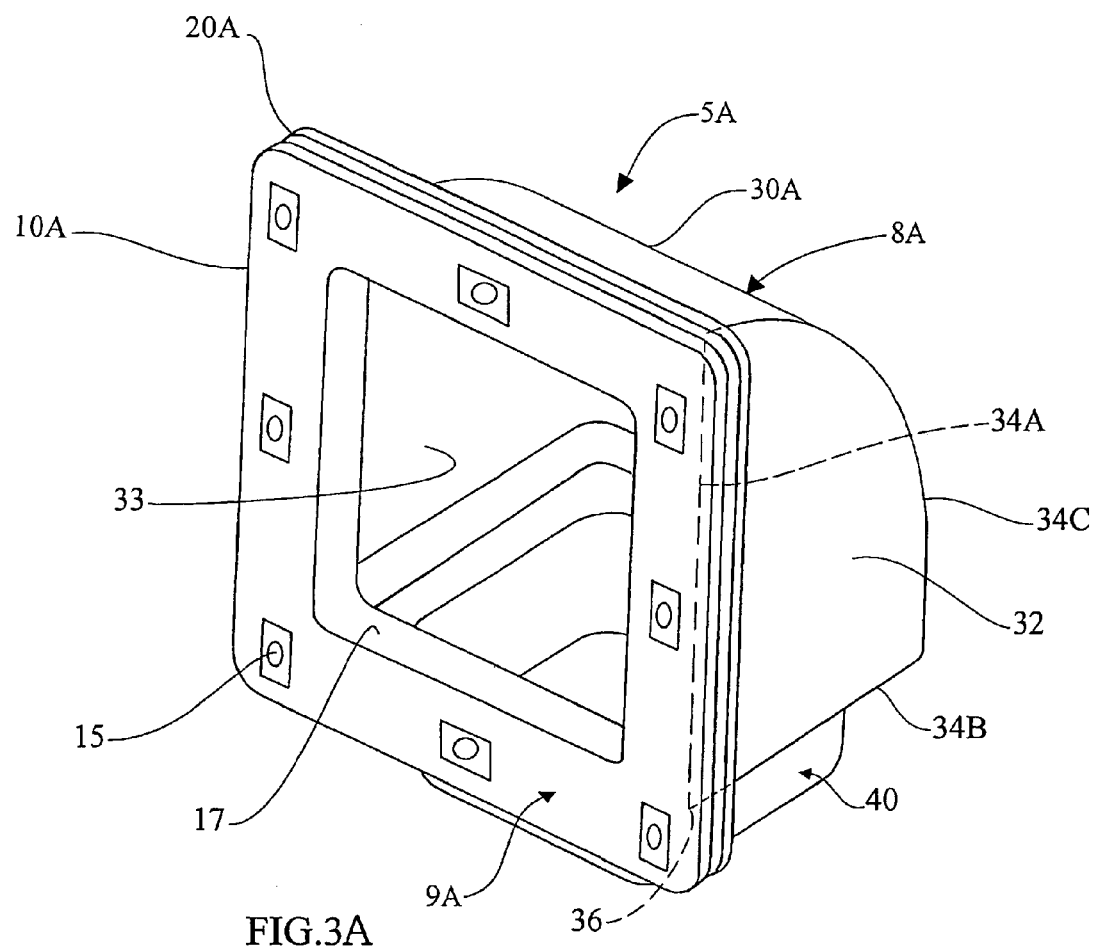
FIG. 3A shows a perspective view of a second embodiment of feeder apparatus of the invention.
Figure 7A:
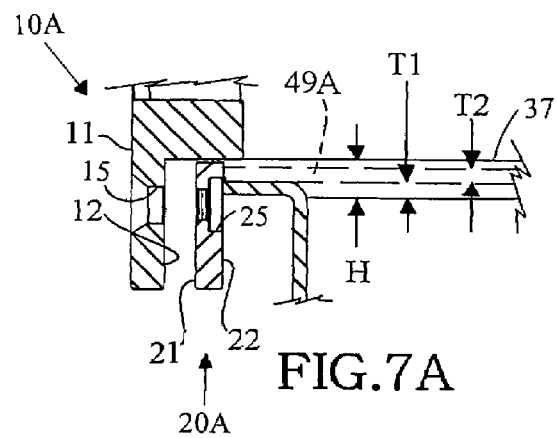
FIG. 7A shows an enlarged view of the mounting structure of the feeder apparatus of FIG. 3A and is taken at the dashed outline indicated in FIG. 3C.

Referring to FIGS. 1A, 1B, 1C, 2 and 3A, each of flanges 10A and 10B is generally planar, has an outermost perimeter, and an innermost perimeter. The innermost perimeter of flange 10A, 10B, defines an opening extending therethrough. Referring to FIG. 7A, flange 10A, which is representative of e.g. both flanges 10A and 10B, has a first surface 11 facing in a first direction toward the interior of the cage. Flange 10A further has a second surface 12 facing in a second, opposite direction away from the cage. Surface 11 and surface 12 are generally parallel to each other and thus generally define a thickness therebetween. Referring specifically to FIGS. 2-3A, in some embodiments, flange 10A, 10B, has at least one aperture 15 formed therethrough.

Figure 3B:
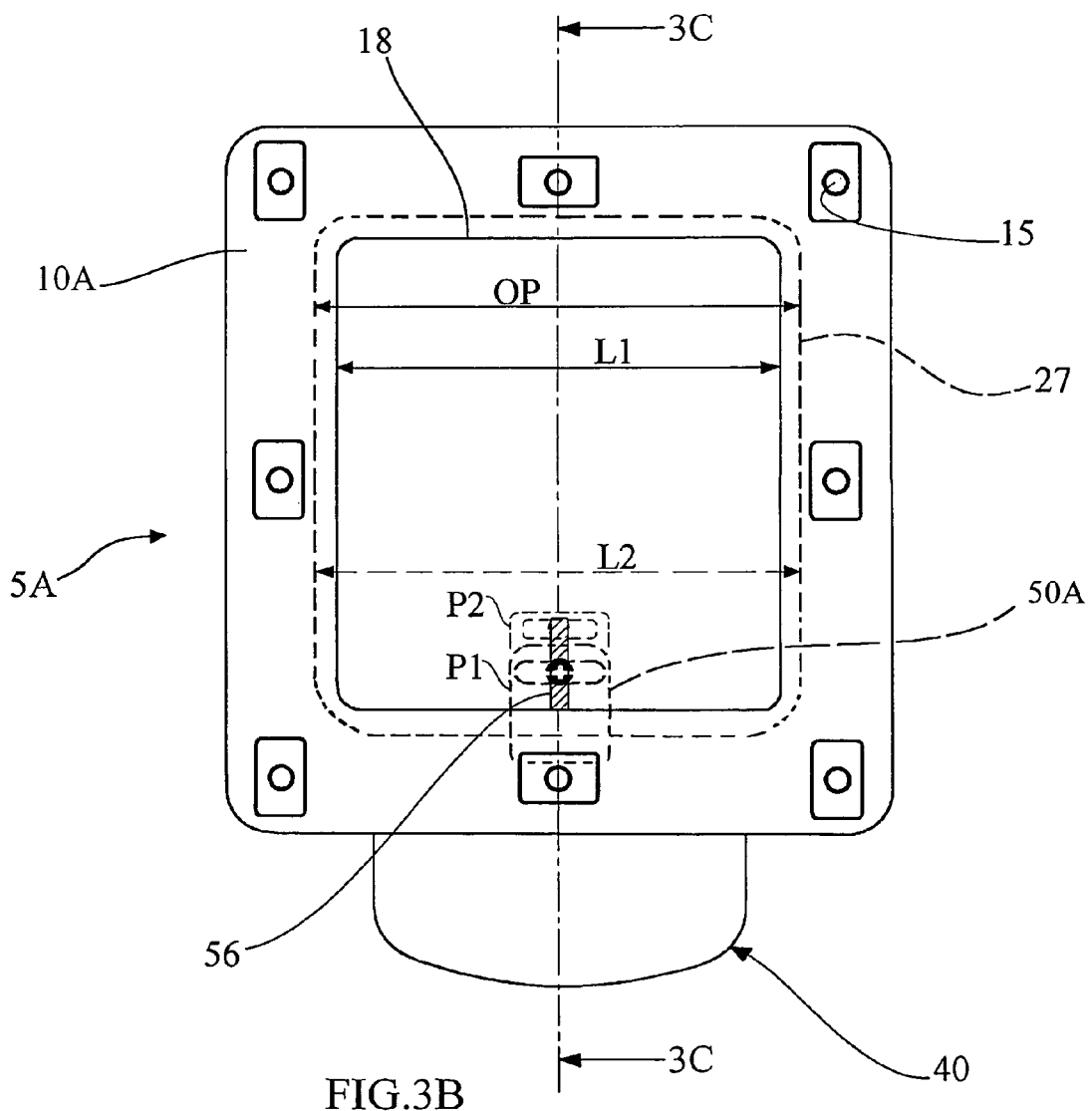
FIG. 3B shows a front elevation view of the feeder apparatus of FIG. 2
Figure 3C:
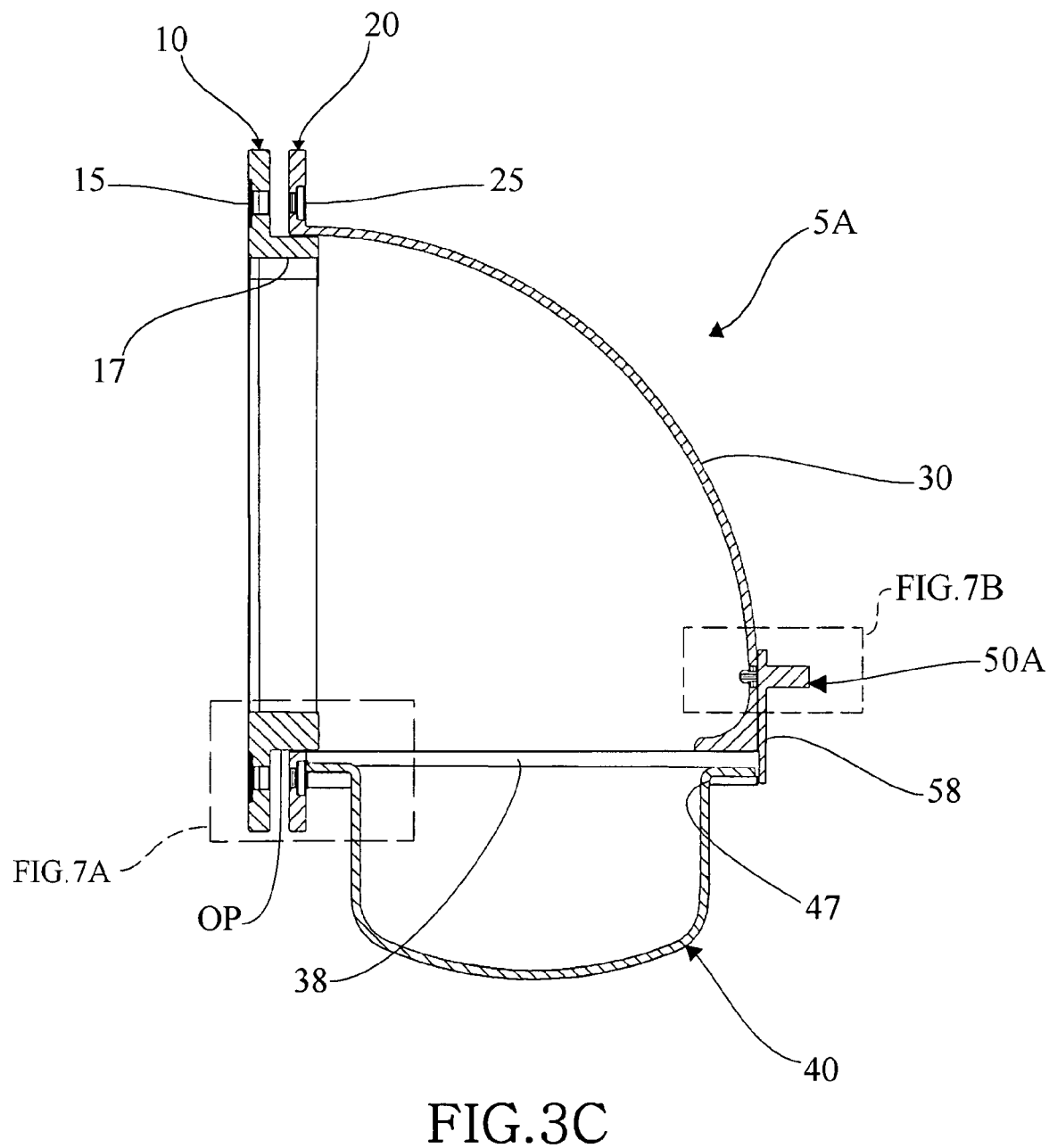
FIG. 3C shows a cross section of the feeder apparatus of FIG. 2 taken at FIG. 3C-FIG. 3C of FIG. 3B.

Ones of flange 20A and 20B are each generally planar, and each has an outermost perimeter, and an innermost perimeter. The innermost perimeter of flange 20A, 20B defines an opening extending therethrough. Referring to FIG. 7A, flange 20A, which is representative of e.g. both flanges 20A and 20B, has a first surface 21 facing a first direction toward the interior of the cage, and a second surface 22 facing a second, opposite direction away from the cage. Surfaces 21 and 22 are generally parallel and thus generally define a thickness therebetween. Referring to FIG. 3C, in some embodiments, flange 20A has at least one aperture 25 formed therethrough.

Figure 4A:
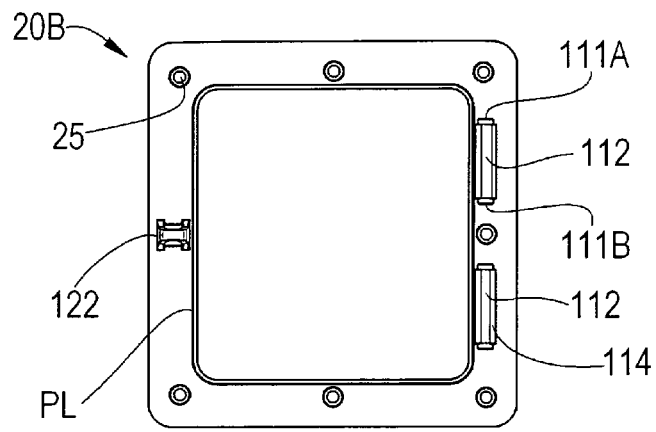
FIG. 4A shows a front elevation view of a second embodiment of mounting flanges of the invention.
Figure 4B:
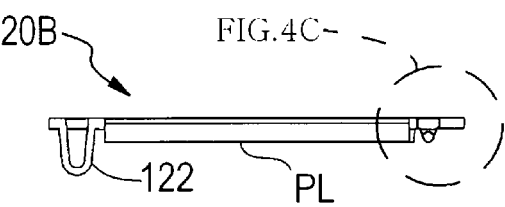
FIG. 4B shows a top, plan, view of the mounting flange of FIG. 4A.

Referring now to FIGS. 4A and 4B, flange 20B is largely analogous, in structure and function, to flange 20A. However, in some embodiments, flange 20B further includes structure adapted and configured to enable pivotable or hinged attachment of components or accessories thereto. Namely, flange 20B includes various components of hinge assembly 110 (FIG. 5A), e.g. hinge pin brackets 111A, 111B, and hinge pin 112. Flange 20B also includes at least part of a locking mechanism, namely latch projection 122.

Figure 4C:
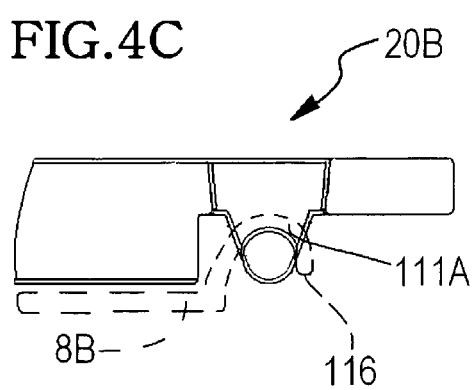
FIG. 4C shows an enlarged view of the portion of the mounting flange of FIGURE B, taken at the dashed circle labeled FIG. 4C.

Hinge pin bracket 111A is generally planar and extends outwardly from, optionally perpendicularly outwardly from, the outwardly facing surface of flange 20B. As viewed from above, as illustrated in the enlarged top plan view of FIG. 4C, hinge pin bracket 111A can be relatively triangular in profile. Such profile and configuration helps transfer various loads, which are applied to various portions of hinge assembly 110 during use, to flange 20B, thereby reducing the likelihood of breaking the pin bracket off from the flange during normal use. However, any configuration of hinge pin bracket 111A, which suitably attaches e.g. hinge pin 112 to flange 20B so as to provide a desired use-life of the hinge assembly 110, is well within the scope of the invention.

Hinge pin 112 is an elongate, generally cylindrical member. A first end of hinge pin 112 is attached to the bottom surface of an upper hinge pin bracket, namely hinge pin bracket 111A, and the remainder of the pin extends generally downwardly therefrom. The size, shape, configuration, and/or other characteristics of hinge pin 112 correspond to the size, shape, configuration, and/or other characteristics of other components of hinge assembly 110, such as hinge barrel 116 (FIGS. 4C, 5A, 6B), described in greater detail elsewhere herein. A second end of hinge pin 112 is attached to a lower hinge in bracket, namely hinge pin bracket 111B.

Like hinge pin bracket 111A, hinge pin bracket 111B is generally planar and extends outwardly from, optionally perpendicularly outwardly from, the outwardly facing surface of flange 20B. As viewed from above or below, hinge pin bracket 111B can be relatively triangular in profile. Such profile and configuration helps transfer various loads, which are applied to various portions of hinge assembly 110 during use, to flange 20B, thereby reducing the likelihood of breaking the pin bracket off from the flange during normal use. However, as with hinge pin bracket 111A, any configuration of hinge pin bracket 111B which suitably attaches e.g. hinge pin 112 to flange 20B, so as to provide a desired use-life of the hinge assembly 110, is well within the scope of the invention.

In some embodiments, such as the one illustrated in FIG. 4A, flange 20B includes an elongate void which lies generally beneath hinge pin 112, e.g. void 114. When used with flange 20B, void 114 provides clearance for the corresponding hinge component(s) such as hinge barrel 116, whereby the hinged accessory, be it feeder body 8B, blocking plate 49B, or otherwise, can freely pivotably actuate with respect to flange 20B, without the hinge components binding or otherwise mechanically engaging or interfacing each other.

In some embodiments, such as those illustrated in FIGS. 4A and 4B, flange 20B further includes a perimeter lip PL. Perimeter lip PL provides a mechanical interface, overlappingly, insertingly, or otherwise, between flange 20B and various other components of feeder apparatus 5A, 5B, e.g. feeder body 8B, blocking plate 49B, and/or others.

Perimeter lip PL extends generally perpendicularly outwardly away from the outwardly facing surface of flange 20B. In some embodiments, perimeter lip PL is adjacent, optionally outwardly displaced from, the inner perimeter of the opening which extends through flange 20B. Whilst in some embodiments, the inner surface of perimeter lip PL is coplanar with the inner surface of the inner flange opening, whereby the inwardly facing wall of the inner flange opening extends generally continuously along the inwardly facing surface of perimeter lip PL.

Referring now to FIGS. 4A and 4B, as desired, flange 20B further includes latch projection 122. Latch projection 122 extends outwardly away from the outwardly facing surface of flange 20B, and is adapted and configured to accept e.g. a lock or other security device or fastener therethrough.

In some embodiments, latch projection 122 is and elongate, rigid member with first and second relatively straight-line portions and an arcuate portion extending therebetween. In other words, latch projection 122 is generally "U-shaped" or "D-shaped", optionally other suitably outwardly jutting or out-thrusting configurations. In yet other embodiments, latch projection 122 is hasp-type member or other portion of a locking mechanism. The specific configuration and characteristics of latch projection 122 enables the latch projection to cooperate with corresponding structure on the accessory which can be locked thereto, e.g. feeder body 8B, blocking plate 49B, and/or others.

Regardless of the particular configuration of flange 20A, 20B, the flange is adapted and configured to interface with, cooperate with, and/or otherwise communicate with, feeder body 8A, 8B, and/or other accessories and components of feeder apparatus 5A, 5B, including, but not limited to, blocking plate 49B and/or others.

In some embodiments, the feeder body is integrally connected to, i.e. is an integral extension of, one of the mounting flanges. Exemplary of such configuration is feeder apparatus 5A, illustrated in FIGS. 1A, 2, 3A, 3B, 3C, wherein feeder body 8A is fixedly connected to flange 20A, thereby defining a single, unitary, structure.

In yet other embodiments, the feeder body or blocking plate is e.g. pivotably, rotatably, hingedly, optionally removably, connected to one of the mounting flanges. Exemplary of such configurations are feeder apparatus 5B and blocking plate 49B, illustrated in e.g. FIGS. 1B and 1C.

Figure 8:
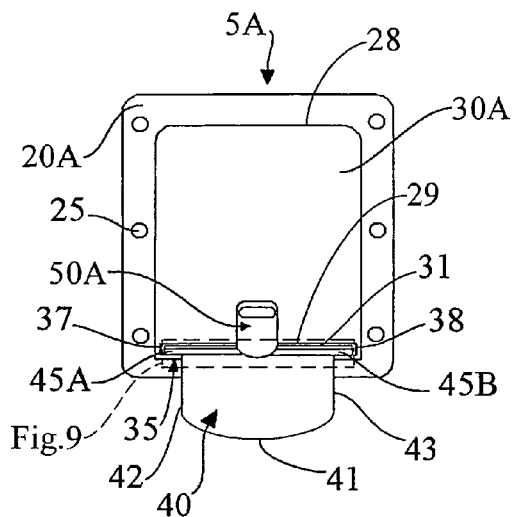
FIG. 8 shows a rear elevation view of the feeder apparatus of FIG. 3.

Referring now to FIGS. 1A, 1B, 2, 3A, 3B, 3C, 5B, ones of feeder apparatus 5A, 5B further include a feeder body 8A, 8B comprising a hood/enclosure, such as arcuate top wall 30A, a plurality of walls and/or panels, e.g. side wall 32, side wall 33, and bottom wall 35 (FIG. 8). Arcuate top wall 30A extends away from cage 1, outwardly of flange 20A and curves arcuately downwardly in progressing away from flange 20A.

As illustrated in FIG. 3C, top wall 30A has an outwardly facing surface, an inwardly facing surface, and a generally arcuate profile. As illustrated in FIG. 8, top wall 30A has an upper edge 28 which generally communicates with flange 20A, and a lower edge 29 displaced from flange 20A. A pair of generally parallel lateral sides of top wall 30A extends between the upper edge and the lower edge of top wall 30A. In some embodiments, a slot 31 is located at or adjacent the lower edge 29 of top wall 30A, and extends from outside the feeder into the inner space inside the feeder body.

Side wall 32 is depicted as being generally planar, although such side wall can have a variety of configurations, and has two generally straight edges, e.g. first and second generally straight edges 34A, 34B and at least one other edge, e.g. a third relatively arcuate edge 34C where side wall 32 meets top wall 30A. In some embodiments, first generally straight edge 34A and second generally straight edge 34B are perpendicular to each other. Accordingly, one of the first and second straight edges is typically oriented vertically when the feeder is mounted to a cage, whereby the other straight edge is oriented horizontally.

The vertical and horizontal straight edges of side wall 32 have a common first point of terminus 36 where the edges come together. Each of the vertical and horizontal straight edges has a second, non-common point of terminus where such edges approach the lower edge of top wall 30A. A third generally arcuate edge extends between the non-common point of terminus of the vertical edge and the non-common point of terminus of the horizontal edge of side wall 32. The third generally arcuate edge communicates with a corresponding one of the lateral edges of top wall 30A.

Like side wall 32, side wall 33 is depicted as being generally planar, although such side wall can have a variety of configurations, and has two generally straight edges, e.g. first and second generally straight edges 34A, 34B and at least one other edge, e.g. a third relatively arcuate edge 34C where side wall 33 meets top wall 30A. In illustrated embodiments, first generally straight edge 34A and second generally straight edge 34B are perpendicular to each other. Accordingly, one of the first and second straight edges is typically oriented vertically when the feeder is mounted to a cage, whereby the other straight edge is oriented horizontally.

The vertical and horizontal straight edges of side wall 33 have a common first point of terminus 36 where the edges come together. Each of the vertical and horizontal straight edges has a second, non-common point of terminus where such edges approach the lower edge of top wall 30A. A third generally arcuate edge extends between the non-common point of terminus of the vertical edge and the non-common point of terminus of the horizontal edge of side wall 33. The third generally arcuate edge communicates with a corresponding one of the lateral edges of top wall 30A.

The vertical and horizontal straight edges of side walls 32, 33 can be other than straight, and can be oriented in other upright and generally lateral directions, other than respectively vertically and horizontally, by design choice without departing from the scope of the invention.

Bottom wall 35 is illustrated as being generally planar (FIG. 8). In some embodiments, bottom wall 35 has a length dimension which corresponds to feeder body length (L), a width dimension which corresponds to feeder body width (W), an upper surface and a lower surface. In preferred embodiments, the bottom wall has an opening 47 extending therethrough.

Bottom wall 35 comprises the lower most portion of feeder body 8A, 8B. In some embodiments, bottom wall 35 comprises the structure which supports feed holder 40, e.g. channels 37, 38 and as expressed herein also includes the void extending between and/or through the feed holder support structure, e.g. opening 47. In yet other embodiments, feeder apparatus 5A, 5B is generally, optionally substantially, optionally completely devoid of bottom wall 35, as desired.

Figure 9:
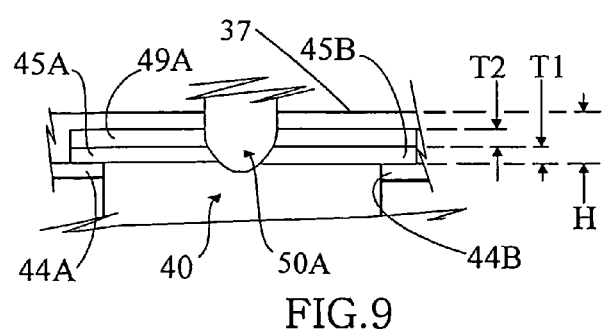
FIG. 9 shows an enlarged view of a portion of the feeder apparatus of FIG. 3 and is taken at the dashed outline indicated in FIG. 8.

Referring to FIGS. 8 and 9 in some embodiments, bottom wall 35 comprises two lateral segments which extend outwardly from the inner perimeter of flange 20A, e.g. first and second lateral segments 44A, 44B. First and second lateral segments 44A, 44B of bottom wall 35 have a distance therebetween which corresponds to a width dimension of opening 47.

In some embodiments, feeder apparatus 5A further comprises channels 37 and 38. As illustrated in e.g. FIGS. 3C, 7A, and 8, channels 37 and 38 are receiving structures which extend generally along the horizontal edges of side walls 32 and 33 respectively adjacent the intersections of bottom wall 35 with side walls 32, 33. Referring specifically to FIG. 7A, channel 37 has a minimum channel height dimension (H) defined by the minimum distance between the upper and lower surfaces of the channel.

Feeder apparatus 5A, 5B also comprises a feed holder 40. Referring to FIGS. 1A and 1B, in the complete assemblage of feeder apparatus 5A, 5B, feeder holder 40 is housed adjacent the outwardly facing surface of flange 20A, 20B. Namely, the portion of feed holder 40 which is most proximate the cage is displaced therefrom by a distance which has a magnitude less than the magnitude of the length dimension of feed holder 40.

As illustrated in FIG. 8, in some embodiments, feed holder 40 has a floor, namely bottom 41. Sides 42 and 43 of feed holder 40 extend upwardly from bottom 41 and define a space therebetween, which generally defines a feed-holding receptacle within feed holder 40 for receiving and holding foodstuff.

In some embodiments, at least one of sides 42, 43 includes a lateral guide, namely elongate projection or flange, as a slidable element, e.g. one of rails 45A and 45B. Referring to e.g. FIGS. 7A and 8, each of rails 45A and 45B has an upper surface, a lower surface and a thickness dimension (T1) therebetween.

Referring specifically to FIGS. 1C and 7A, in some embodiments, feeder apparatus 5A, 5B includes a blocking plate 49A, 49B, which enables a user of feeder apparatus 5A, 5B to selectively restrict a confined animals' access to at least part of feeder apparatus, optionally to restrict the animal to the confines of cage 1. Each of plates 49A and 49B is preferably generally planar, has a width dimension, a length dimension, and an outer perimeter. Plate 49A has an upper surface, a bottom surface, and a thickness dimension (T2) therebetween.

Regardless of the particular shapes, dimensions, and/or other characteristics of blocking plates 49A, 49B, the plates are adapted and configured to restrict the confined animals' access to certain locations, be it food tray 40 as with blocking plate 49A or be it the outside surroundings of cage 1 as with blocking plate 49B.

Figure 7B:
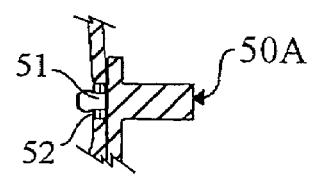
FIG. 7 shows a portion of the locking mechanism of the feeder apparatus of FIG. 3A and is taken at the dashed outline indicated in FIG. 3C.

Referring to FIG. 2, in some embodiments, feeder apparatus 5A has a locking mechanism, e.g. lock 50A for selectively preventing the removal of feed holder 40 from the feeder body. Referring specifically to FIG. 7B, in the illustrated embodiment, lock 50A includes a lock mounting mechanism, e.g. protuberance 51, which is a generally cylindrical projection adapted to be received into a corresponding opening, e.g. aperture 52 and/or other guide.

In some embodiments, aperture 52 is a generally annular opening formed through top wall 30A. In the illustrated embodiments, lock 50A includes tab 58 adapted to selectively project across slot 31 when the lock is in the locking position.

Similar to lock 50A, lock 50B includes tab 58 which selectively provides a mechanical interface which prevents the non-desired removal of feed holder 40 from the feeder apparatus. As visible in FIG. 1B, lock 50B includes a pin, bolt, screw, rivet, and/or other piece of suitable hardware as protuberance 51. Such a version of protuberance 51 extends through the entire thickness of tab 58 and pivotably attaches the lock 50B to the feeder body 8B, and thus also generally defines the axis of pivotation of the lock mechanism.

As desired, in some embodiments, protuberance 51 is snap-lockingly and/or otherwise frictionally and removably held in aperture 52. In such embodiments, a user removes the lock 50A, 50B from the feeder body 8A, 8B to withdraw feed tray 40. Then the user snaps or otherwise inserts the lock 50A, 50B back into the aperture 52 to again mechanically prevent non-desired removal of feed tray 40.

Referring to FIGS. 1A-3A, cage 1 provides a wall upon which feeder apparatus 5A is mounted. The wall of cage 1 upon which feeder apparatus 5A is attached has an opening therethrough. In preferred embodiments, the opening through the wall of cage 1 generally follows the outline of the openings through flanges 10A and 20A.

Referring to FIG. 3C, in some embodiments, flanges 10A and 20A are oriented along generally parallel planes with edge portions of the cage wall, which surrounds the opening in the cage wall, between flanges 10A and 20A. As seen in FIGS. 3C and 7A, in the illustrated embodiments, a plurality of apertures 15 extend through flange 10A and are generally perpendicular to surfaces 11 and 12 of flange 10A. Apertures 25 extend through flange 20A and are generally perpendicular to surfaces 21 and 22 of flange 20A. In preferred embodiments, apertures 15 and 25 are aligned with each other when the inner perimeters of flanges 10A and 20A are coaxial with each other, enabling a single piece of fastening hardware to pass through both aperture 15 and aperture 25 as well as through the portion of the cage wall which surrounds the cage wall opening where the feeder is installed.

Referring to FIGS. 3A and 3C, in some embodiments, flange 10A further comprises a protrusion, e.g. lip 17, which extends toward flange 20A. As seen in FIG. 3B, flange 10A has innermost perimeter 18 which defines opening length (L1) and an outer perimeter (OP) at lip 17. Flange 20A has innermost perimeter 27, which defines opening length (L2). In some embodiments, the magnitude of length (L2) is greater than the magnitude of the length across outer perimeter (OP) of lip 17 whereby, in the illustrated embodiments, lip 17 fits inside the opening defined at (L2).

In preferred embodiments, the opening extending through flange 20A is sized and configured to enable lip 17, and thus flange 10A, to slidingly communicate therewith. In some embodiments, lip 17 is on flange 10A and extends into the opening in flange 20A, as illustrated. In other embodiments, not shown, lip 17 is on flange 20A, extending toward flange 10A, whereby lip 17 extends toward the opening in flange 10A.

In some embodiments, flange 10A has a depression, e.g. countersink formed where aperture 15 opens through surface 11, as visible in, for example, FIG. 7A. The countersink is adapted to receive e.g. the head of the mounting hardware therein. Accordingly, the countersink enables the mounting hardware, when tightened in mounting activity, to reside flush in the flange and to thereby not protrude beyond the surface of the flange, and into the cage.

In preferred embodiments, lip 17 on flange 10A extends through an opening in the cage wall and toward feeder body 8A. In preferred embodiments, lip 17 away from flange 10A, e.g. away from surface 12, a distance whose magnitude is greater than the magnitude of the thickness dimension of the cage wall. Accordingly, lip 17 extends completely through the cage wall and into flange 20A thus masking the cut edge of the cage wall from contact with the confined animal.

Since lip 17 extends into flange 20A, lip 17 correspondingly covers the inner most portion of the distance, between surfaces 12 and 21, which separates flanges 10A and 20A. Accordingly, lip 17 prevents the animal accessing the mounting hardware which extends through apertures 15 and 25, by reaching between flanges 10A and 20A at the opening in the cage wall.

In preferred embodiments, lip 17 extends sufficiently far outwardly of the cage side wall and thus outwardly of surface 12 of flange 10A, toward feeder body 8A when mounted on the cage side, so that lip 17 spans the thickness of the side wall of cage 1 at the opening where the feeder is mounted, whereby lip 17 can effectively project beyond surface 12, into flange 20A when feeder apparatus 5A is installed on any of a wide variety of cage walls of differing thicknesses, thereby enabling feeder apparatus 5A to be mounted onto a variety of cage walls.

In other embodiments, lip 17 extends from flange 20A, e.g. outwardly from surface 21 and is adapted to project a limited distance into flange 10A beyond surface 21. Lip 17 extends sufficiently far into flange 10A to cover the distance separating flanges 10A and 20A.

Covering the distance separating flanges 10A and 20A, and protecting the hardware extending between flanges 10A and 20A from access at the cut edge of the cage side wall, prevents the confined animal from picking at, scratching at, and/or otherwise disturbing the mounting hardware from inside cage 1 at the cut edge of the side wall.

FIG. 3C illustrates a preferred embodiment of top wall 30A. As seen in FIG. 3C, a portion of flange 20A is attached to the upper edge of top wall 30A. From this attachment point, top wall 30A extends arcuately in a downwardly arching direction, forming an arc which may or may not be generated about a single point of origin. Referring to FIG. 8, in some embodiments, slot 31 is located at or adjacent the bottom edge of top wall 30A. Slot 31 is a generally elongate opening, which spans between the generally parallel lateral edges of top wall 30A.

Referring to FIG. 3C, the shape of the profile of the arc, defined by top wall 30A, corresponds generally to the shape of the arcuate edge of each of side walls 32 and 33, respectively. Accordingly, as illustrated in FIGS. 2 and 3A, one of the generally parallel lateral edges of top wall 30A is joined to the arcuate edge of side wall 32. The other one of the generally parallel lateral edges of top wall 30A is joined to the arcuate edge of side wall 33.

The vertical edges of side walls 32 and 33 are joined to flange 20A. The horizontal edges of side walls 32 and 33 are attached to the first and second lateral segments 44A, 44B of bottom wall 35, respectively. The cage-facing portion of bottom wall 35 is joined to flange 20A. Accordingly, feeder apparatus 5A comprises an inner space 39 defined between top wall 30A, side walls 32 and 33, and bottom wall 35.

Opening 47 (FIG. 3C) is defined between the first and second lateral segments 44A, 44B of bottom wall 35. Opening 47 extends through bottom wall 35, thereby enabling access into inner space 39 defined inside feeder body of feeder apparatus 5A, from below the feeder body.

Referring to FIG. 8, the magnitude of the distance between the first and second lateral segments 44A, 44B of bottom wall 35 corresponds generally to the width and configuration of feed holder 40. Accordingly, bottom wall 35 is adapted to receive feed holder 40, and to support feed holder 40, in lateral segments 44A and 44B. In some embodiments, bottom wall 35 comprises merely the structure which supports feed holder 40, e.g. the structure which defines channels 37, 38.

Channels 37 and 38 define the space between the upper and lower segments of the respective channel structure typically between upper surfaces of lateral segments 44A, 44B and lower surfaces of side walls 32, 33. In some embodiments, each of lateral segments 44A, 44B extends from one of side walls 32 and 33, and channels 37 and 38 are defined at the surface of lateral segments 44A, 44B, respectively. In some embodiments, the distal ends of slot 31 communicate with channels 37 and 38. In the illustrated embodiments, the magnitude of the slot opening height dimension of slot 31 corresponds to the magnitude of channel minimum height dimension (H) of channels 37 and 38.

Referring to FIG. 9, in preferred embodiments, both the magnitude of channel minimum height dimension (H), and the magnitude of the slot opening height dimension of slot 31, is greater than the sum of the magnitudes of thickness dimensions (T1) and (T2). Accordingly, channels 37 and 38 and slot 31 are adapted to simultaneously receive and house rails 45A and 45B respectively of feed holder 40, and blocking plate 49A where plate 49A overlies rails 45A, 45B.

Referring to FIGS. 1A, 1B, 2, 3A, 3B, 3C, in some embodiments, feed holder 40 generally characterizes, defines the lowermost portion of feeder apparatus 5A. As illustrated in FIG. 8, in preferred embodiments, bottom 41 is generally concave. Sides 42 and 43 of feed holder 40 extend upwardly from lateral portions of bottom 41.

Sides 42 and 43 are joined to each other by a front panel and a back panel (not labeled). In preferred embodiments, bottom 41, side 42, side 43, and the front and back panels define a recess, e.g. a receptacle, in feed holder 40. The top of the receptacle is substantially open, enabling access into the receptacle of feed holder 40 from above. The opening of the receptacle has a shape and size which corresponds generally to the shape and size of the opening 47 which extends through bottom wall 35.

Typically, bottom wall 35 comprises lateral segments 44A, 44B which have a space therebetween, such as opening 47. The opening of the receptacle in feed holder 40 typically has length and width dimensions which correspond generally to length and width dimensions of opening 47 of bottom wall 35.

Referring to FIGS. 2 and 3A, the opening extending through bottom wall 35 superposes, e.g. is generally above the receptacle of feed holder 40. The corresponding relationship between opening 47, through bottom wall 35 and into feed holder 40, enables the caged animal to have access to the receptacle of feed holder 40 from within the inner space of feeder apparatus 5A.

In some embodiments rail 45A is joined to and extends outwardly from the upper portion of side 42 of feed holder 40, and rail 45B is joined to and extends outwardly from the upper portion of side 43 of feed holder 40. Rails 45A and 45B are sized and configured to be slidingly received into channels 37 and 38 respectively. In preferred embodiments, side walls 32 and 33, and rails 45A and 45B, are sufficiently strong/rigid to bear the load of feed holder 40, when rails 45A and 45B are inserted into channels 37 and 38 and can thereby block entrances/egress into or from cage 1 through bottom wall 35, when feed holder 40 is removed e.g. for servicing and/or filling.

The distance between channels 37 and 38 corresponds generally to the width dimension of blocking plate 49A. The length of each of channels 37 and 38 corresponds generally to the length dimension of blocking plate 49A. The magnitude of thickness dimension (T2) of blocking plate 49A is less than the magnitude of channel minimum height dimension (H) of channels 37 and 38. Accordingly, blocking plate 49A is cooperatively sized and configured along with channel 37, 38, so that blocking plate 49A can be slidingly received into channels 37 and 38.

Referring now to FIGS. 1B, 5A, 5B, and 5C, unlike feeder body 8A of feeder apparatus 5A, feeder body 8B of feeder apparatus 5B is hingedly connected to flange 20B. Accordingly, although feeder body 8B is largely analogous to feeder body 8A, feeder body 8B further includes an additional outer perimeter flange, various components of a hinge assembly, and various components of a latch assembly. Namely, feeder body 8B further includes flange 20C, hinge barrels 116, and latch tab 126.

Flange 20C is adapted and configured to interface with flange 20B, and suitably seal and/or other wise connect the feeder body 8B to flange 20B when the feeder body is in the closed, in-use, position. In particular, flange 20C is generally planar and has an outer perimeter shape which corresponds to the outer perimeter shape of feeder body 8B, at the opening thereof which opens into cage 1.

Stated another way, flange 20C extends radially outwardly from the outer surfaces of the walls which define feeder body 8B outer perimeter, adjacent its cage-facing portion. In some embodiments, in the entire assemblage of feeder apparatus 5B, and perimeter lip PL of flange 20B inserts into cage-facing opening of the feeder body. Also in the completely assembled state, the outwardly facing surface of flange 20B is in face to face communication with the cage-facing surface of flange 20C.

Referring now to FIGS. 1B, 4C, 5A, 5B, and 5C, each of hinge barrels 116 is adapted and configured to rotatably house hinge pin 112 therein. In some embodiments, the hinge pins 112 are generally permanently housed within the hinge barrels 116. In such embodiments, hinge barrels 116 are generally hollow, cylindrical members, rotatably housing hinge pins 112 therein.

Figure 5A:
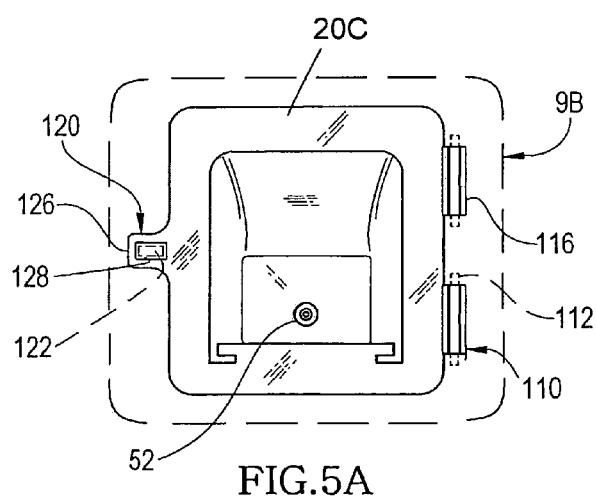
FIG. 5A shows a rear elevation of the feeder body of FIG. 1B.
Figure 5B:
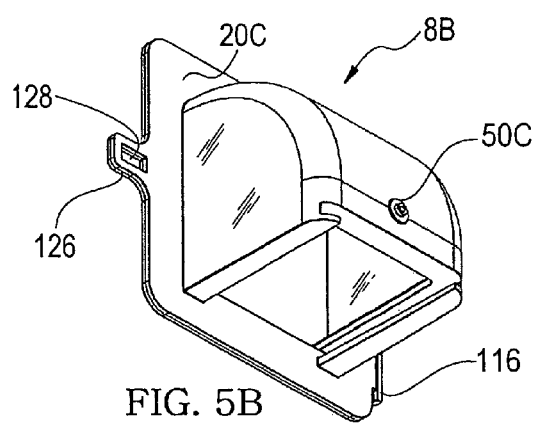
FIG. 5B shows a pictorial view of the feeder body of FIG. 5A.
Figure 5C:
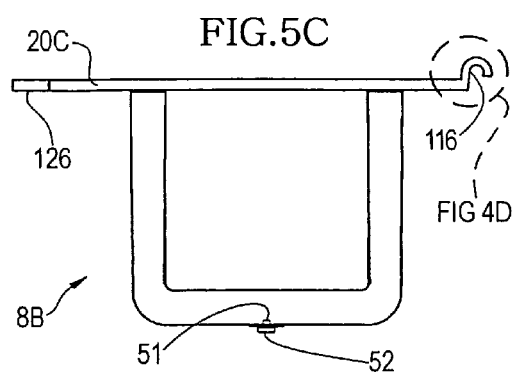
FIG. 5C shows a top, plan, view of the feeder body of FIG. 5B.

In other embodiments, such as those illustrated in FIGS. 5A and 5C, hinge barrels 116 are adapted and configured to removably, releasably, and/or otherwise detachably house hinge pins 112 therein. Accordingly, hinge barrels 116 are generally C-shaped in profile, and thereby define an elongate opening thereinto.

The width dimension of the hinge barrel 116 elongate opening has a magnitude with is preferably less than the magnitude of the diameter of hinge pin 112. Accordingly, assembling hinge barrel 116 to hinge pin 112 requires at least some force applied thereto, whereby the feeder body 8B is e.g. snap-lockingly and/or otherwise removably attached to the flange 20B. Also due to the relative dimensions of the hinge barrel opening and the hinge pin 112, when assembled to the hinge pin, hinge barrel 116 is adapted and configured to resist freely falling off the hinge pin.

Nevertheless, the radius of the inner surface of hinge barrel 116 and thus the relative dimensions of the void within hinge barrel 116 and the inner surface characteristics thereof correspond closely to the dimensions and outer surface characteristics of hinge pin 112. Such corresponding characteristics enable feeder body 8B to suitably freely pivot upon hinge pin 112 without non-desired amounts of free-play and without falling off the pin.

Feeder body 8B further includes latch tab 126. Latch tab 126 is generally planar and extends outwardly from an edge of flange 20C (FIG. 5B). Aperture 128 extends through the entire thickness of latch tab 126. Aperture 128 is adapted and configured to receive latch projection 122 therethrough, when the feeder body 8B is in the closed in-use position, whereby the latch tab 126 circumferentially surrounds latch projection 122 when the feeder body is closed against flange 20B. Accordingly, latch projection 122, latch tab 126, alone and/or in combination with an auxiliary lock or other security device, enable a user to selectively secure the feeder body 8B in such closed position.

Referring generally to FIGS. 1A, 3B and 3C, a user can remove feed holder 40 from feeder apparatus 5A without opening the main access door (D) of cage 1 and/or inserting his/her arm into cage 1. Instead, the user of feeder apparatus 5A can access feed holder 40 from the outside of cage 1.

As illustrated in FIGS. 3B, 3C and 7B, feed holder 40 can be removed through slot 31, out channels 37 and 38, by manipulating lock 50A. In some embodiments, lock 50A can be temporarily or permanently removed from, e.g. pulled out of, aperture 52, thus removing the obstruction of lock 50A across slot 31.

Alternatively, lock 50A, specifically tab 58, can be pivoted or slid out of the way of slot 31 so as to remove the obstruction of lock 50A across slot 31. Referring to FIG. 7B, protuberance 51 can rotate within aperture 52. Accordingly, lock 50A pivots about aperture 52 at protuberance 51.

Referring to FIG. 3B, in some embodiments, lock 50A can be slid in a generally linear path out of the way of slot 31 so as to remove the obstruction of lock 50A across slot 31. Lock 50A is restricted to a generally linear travel path by guide 56, enabling a user to bias lock 50A between a first position (P1) and a second position (P2).

When slot 31 is free from obstruction of lock 50A, feed holder 40 can be slidably or otherwise removed from feeder apparatus 5A. Feed holder 40 can be removed out the back of feeder apparatus 5A, e.g. the portion most distant from cage 1, through slot 31. The configuration and orientations of channels 37 and 38 and feed holder 40, collectively, dictate the removal travel path of feed holder 40. As illustrated in FIGS. 1A and 3C, in some embodiments, feed holder 40 is slidably removed in a direction generally perpendicular to flanges 10A and 20A.

In preferred embodiments, both the magnitude of channel minimum height dimension (H), and the magnitude of the minimum slot opening height dimension of slot 31, are greater than the sum of the magnitude of thickness dimension (T1) and the magnitude of thickness dimension (T2), thus enabling blocking plate 49A and feed holder 40 to be simultaneously received and held within channels 37 and 38. Accordingly, a user can insert blocking plate 49A though slot 31, into channels 37 and 38 and over bottom wall 35 of the feeder while feed holder 40 is in place installed in feeder apparatus 5A.

By inserting plate 49A into feeder apparatus 5A at slot 31, and channels 37, 38, prior to removing feed holder 40, the user provides a blocking plate which blocks the opening 47 though the bottom of the feeder, and thus blocks any and all possible escape routes by which the confined animal might escape, via the opening 47 which is defined through bottom wall 35 when the feed holder is removed.

Similarly a user can prevent possible escape of the confined animal when the feed holder 40 is being reinstalled in the feeder, by inserting/re-inserting feed holder 40 into feeder apparatus 5A while blocking plate 49A remains in place, held in channels 37 and 38 and slot 31 of the feeder.

Thus, blocking plate 49A can physically block access out of feeder apparatus 5A via the opening through bottom wall 35 during removal and insertion of feed holder 40, e.g. at any time the feed holder is out of feeder apparatus 5A, from and into feeder apparatus 5A. Accordingly, blocking plate 49A enables a user to remove feed holder 40 from feeder apparatus 5A, fill/refill the contents of feed holder 40 and/or perform maintenance/repair upon feed holder 40, with confidence that the confined animal will not escape through bottom wall 35.

In alternative embodiments, channels 37 and 38, and a slot corresponding to slot 31, are located at least one of mounting structure 9A, side walls 32 and 33, or top 30A, such that blocking plate 49A can be slidingly inserted into, and out of, the channels and slot, generally parallel to the cage wall through at least one of mounting structure 9A, side walls 32 and 33, or top 30A. Lock 50A is removably and/or slidably mounted to at least one of mounting structure 9A, side walls 32 and 33 or top 30A, via the coupling of protuberance 51 into a corresponding opening, e.g. aperture 52 and/or guide 56 extending through at least one of mounting structure 9A, side walls 32 and 33, or top 30A.

In some embodiments, channels 37 and 38 extend between the upper or lateral segments 44A, 44B and lower surface or side walls 32, 33. In some embodiments, channels 37 and 38 are formed into lateral segments 44A, 44B. In yet other embodiments, channels 37 and 38 are formed directly into side walls 32 and 33.

In alternative embodiments, channels 37 and 38 are not located on feeder body 8A, rather are formed into feed holder 40, e.g. feed holder sides 42, 43 and/or feed holder rails 45A, 45B. In such embodiments, feeder body 8A has cooperatively sized and configured lateral guides/elongate projections, as slidable elements which receive channels 37 and 38 of feed holder 40.

In some embodiments, lateral guides/elongate projections, e.g. slidable elements extend from bottom wall 35, indeed the lateral guides can be the totality of the definition of bottom wall 35, and feed holder 40 has corresponding receiving structure, e.g. channels formed therein. In yet other embodiments, receiving structure, e.g. channels are formed into lateral portions of bottom wall 35, and feed holder 40 has corresponding lateral guides/elongate projections, e.g. slidable elements extending therefrom to interface with the channels of bottom wall 35.

In any event bottom wall 35 and/or side walls 32, 33 collectively cooperate with feed holder 40 in defining a sliding combination of channels and rails whereby feed holder 40 can be slid into a mounted position on the feeder body, and out of such mounted position, as desired by the user.

Figure 10:
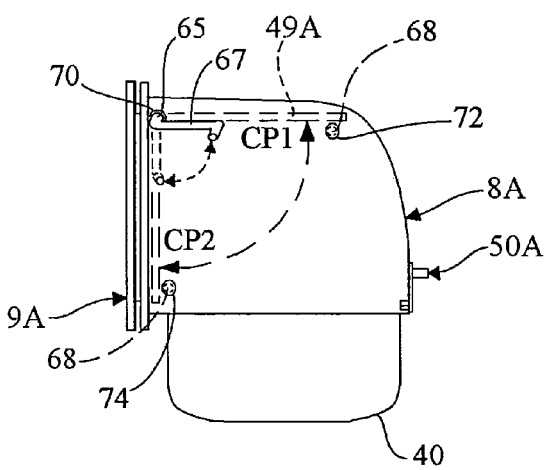
FIG. 10 shows a side elevation view of a third embodiment of feeder apparatus of the invention.

In alternative embodiments, such as the one illustrated in FIG. 10, blocking plate 49A is adapted to pivot about a generally horizontal axis. Accordingly, blocking plate 49A pivots along a generally vertical arcuate travel path, e.g. upwardly and downwardly.

In such embodiments, a closure plate, e.g. blocking plate 49A is adapted and configured to generally remain within inner space 39 of feeder body 8A, and move between a first position (CP1) and a second position (CP2). When blocking plate 49A is in the first position (CP1), the confined animal is generally permitted access to feed holder 40. When blocking plate 49A is in the second position (CP2), the confined animal is generally restricted from accessing feed holder 40.

In other words, in some embodiments, blocking plate 49A pivotably moves between first and second positions (CP1) and (CP2). At least one distal end of blocking plate 49A comprises a pin 65, which extends therethough, and is pivotably mounted to a corresponding pivotal mounting receptacle in mounting structure 9A, e.g. apertures 70, which extend through mounting structure 9A.

Commonly known means of pivotal attachment are suitable to pivotably join blocking plate 49A to at least one of mounting structure 9A, top wall 30A, side walls 32 and 33, and bottom wall 35. Such commonly known means of pivotal attachment include but are not limited to pivoting structure, e.g. pins and/or protuberances which extend outwardly from lateral edges of blocking plate 49A and corresponding pivot receiving structure, e.g. apertures and/or receptacles in mounting structure 9A, top wall 30A, side walls 32 and 33, and bottom wall 35.

Yet other methods of utilizing a blocking plate to restrict access of a confined animal to e.g. the outside surroundings of a cage are considered and well within the scope of the invention. For example, in some embodiments, referring to FIGS. 1C, 6A, and 6B, the blocking plate is adapted to pivot about a generally vertical axis whereby blocking plate pivots along a generally horizontal arcuate travel path, e.g. from side to side. Exemplary of such blocking plate is blocking plate 49B.

In some such embodiments, blocking plate 49B is adapted and configured to temporarily or otherwise selectively replace feeder body 8B, as desired by the user. Namely, blocking plate 49B temporarily replaces feeder body 8B whilst the user, for example, removes feeder body 8B from flange 20B for cleaning, maintenance, and/or otherwise.

In general, blocking plate 49B mounts to the same mounting structure upon flange 20B as feeder body 8B. Accordingly, blocking plate 49B includes various ones of the same components and/or structures that feeder body 8B has, namely, hinge barrels 116 and latch tab 126.

In other words, blocking plate 49B includes hinge barrels 116 which are adapted and configured to house, optionally removably, releasably, and/or otherwise detachably house, hinge pins 112 therein, as do hinge barrels 116 of feeder body 8B.

Figure 6A:
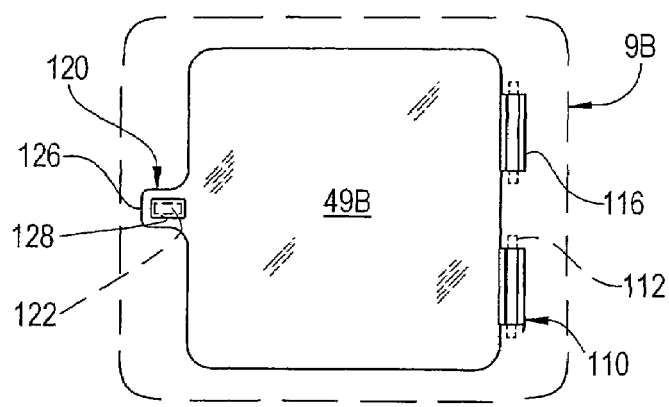
FIG. 6A shows a rear elevation of the blocking plate of FIG. 1C.
Figure 6B:
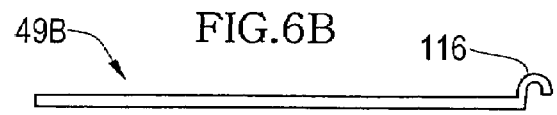
FIG. 6B shows a top, plan, view of the blocking plate of FIG. 6A.

In some embodiments, blocking plate 49B also includes latch tab 126, which is a generally planar member that extends outwardly from and edge of blocking plate 49B (FIG. 6A). Like that of feeder body 8B, latch tab 126 of blocking plate 49B includes aperture 128, which extends through the entire thickness of latch tab 126. Accordingly, when blocking plate 49B is used in combination with flange 20B, latch projection 122, latch tab 126, alone and/or in combination with an auxiliary lock or other security device, enable a user to selectively secure the blocking plate 20B in such closed position.

As desired, some embodiments of feeder apparatus 5B are adapted and configured to simultaneously hingedly or otherwise hold both feeder body 8B and blocking plate 49B. As one example, some embodiments include first and second hinge assemblies, or first and second pairs of hinge assemblies, on generally opposing sides of e.g. flange 20B. Namely, the first and second hinge assemblies are on generally opposite sides, alternatively adjacent sides, of the opening which extends through the mounting flanges.

Accordingly, such embodiments enable a user to switch between a closed, blocking plate blocked, flange condition and a feeder body flange condition without having to remove either the blocking plate or the feeder body. In other words, only one of feeder body 8B and blocking plate 49B can overly, cover, or otherwise be in registration with, the opening that extends through the mounting flanges and into cage 1 at any given time. However, in such embodiments, the user merely (i) hingedly opens feeder body 8B and hingedly closes blocking plate 49B, or (ii) hingedly opens blocking plate 49B and hingedly closes feeder body 8B, to change the respective configuration of the feeder apparatus 5B.

Referring to FIG. 10, in some embodiments, pin 65 comprises lever 67 which is adapted and configured to enable a user of feeder apparatus 5A to rotate pin 65 and correspondingly pivotably move blocking plate 49A between first and second positions (CP1) and (CP2). In some embodiments, feeder apparatus 5A includes rod 68 which is adapted and configured to be held in apertures 72 and 74 and correspondingly to hold blocking plate 49A in first and second positions (CP1) and (CP2), accordingly whereby the confined animal is unable to manipulate plate 49A out of the down, closed position.

To enable the confined animal to access feed holder 40, a user of feeder apparatus 5A inserts rod 68 through apertures 72, underneath blocking plate 49A, thereby restricting blocking plate 49A to first position (CP1). To prevent the confined animal from accessing feed holder 40 while feed holder 40 is out of feeder apparatus 5A, a user of feeder apparatus 5A inserts rod 68 through apertures 74, behind blocking plate 49A, thereby restricting blocking plate 49A to second position (CP2).

Referring to FIG. 1A, a user, e.g. an animal owner/caretaker, installs feeder apparatus 5A onto a wall of cage 1, e.g. a cage wall, as follows. First, the user makes an opening in the cage wall, sized and configured to snugly receive the outer surface of lip 17 on one of flanges 10A, 20A. The user orients the feeder body, including flange 20A, on the exterior side of the cage wall in alignment with the opening in the cage wall, and positions flange 10A on the interior side of the cage wall.

From inside cage 1, the installer installing feeder apparatus 5A places flange 10A against the cage wall, placing surface 12 in physical communication with the interior side of the cage wall about the opening in the cage wall. From outside cage 1, the installer places flange 20A against the cage wall, e.g. the user places surface 21 in physical communication with the exterior side of the cage wall whereby flanges 10A and 20A are generally aligned with, and parallel to, each other, with portions of the cage wall between the flanges.

In preferred embodiments, apertures 15 are coaxial with corresponding apertures 25 as feeder apparatus 5A is being assembled to cage 1, which enables a user to insert fastening hardware such as screws, bolts, clips, clamps, and the like, through corresponding aligned pairs of apertures 15 and 25. Optionally, holes (not shown) are also fabricated in the side wall of cage 1 in alignment with the pairs of apertures 15 and 25, whereby the fasteners draw flanges 10A, 20A toward each other with the cage side wall trapped and held, between the flanges.

By securing the hardware through apertures 15 and 25, and optionally through the cage side wall, the user fastens flange 10A and flange 20A to each other with the cage side wall between flanges 10A, 20A, and correspondingly fastens flanges 10A, 20A, and thus feeder apparatus 5A to the cage wall.

Regarding the installation and use of embodiments such as that illustrated in FIG. 1B, a user installs feeder apparatus 5B in substantially the same manner and procedure as feeder apparatus 5A, previously described.

Namely, the user first makes an opening in the cage wall, sized and configured to snugly receive the outer surface of lip 17 on one of flanges 10B, 20B. The user then orients flange 20B, on the exterior side of the cage wall in alignment with the opening in the cage wall, and positions flange 10B on the interior side of the cage wall.

From inside cage 1, the installer places flange 10B against the cage wall, placing surface 12 in physical communication with the interior side of the cage wall about the opening in the cage wall. From outside cage 1, the installer places flange 20B against the cage wall such that surface 21 is in physical communication with the exterior side of the cage wall. In this condition, flanges 10B and 20B are generally aligned with, and parallel to, each other, with portions of the cage wall between the flanges.

Apertures 15 are coaxial with corresponding apertures 25 as feeder apparatus 5B is being assembled to cage 1, the user inserts fastening hardware such as screws, bolts, clips, clamps, and the like, through corresponding aligned pairs of apertures 15 and 25. Optionally, holes (not shown) are also fabricated in the side wall of cage 1 in alignment with the pairs of apertures 15 and 25, whereby the fasteners draw flanges 10B, 20B toward each other with the cage side wall trapped and held, between the flanges.

By securing the hardware through apertures 15 and 25, and optionally through the cage side wall, the user fastens flange 10B and flange 20B to each other with the cage side wall between flanges and correspondingly fastens flanges 10B, 20B, and thus feeder apparatus 5A to the cage wall.

To use various embodiments of feeder apparatus 5A and 5B, the user selectively blocks the animal within the cage and/or the cage portions of the feeder by way of blocking plates 49A and/or 49B. The user may desire to utilize a blocking plate during at least one of, optionally during other, activities. As some examples, the user may use a blocking plate 49A, 49B (i) while removing feed holder 40 for purposes of refilling, cleaning, or repairing (ii) to prevent the confined animal from accessing food contained in feed holder 40, (iii) while removing feeder body 8B from the remainder of the feeder apparatus for purposes of refilling, cleaning, or repairing, and/or (iv) otherwise as desired.

To use blocking plate 49A, the user slidingly inserts blocking plate 49A into slot 31. Then, the user continues with the intended task, be it removal of feed holder 40 or otherwise. When the user no longer desires to e.g. prevent access to feed holder 40 or the outside surroundings of cage 1, the user slidingly withdraws blocking plate 49A from slot 31.

To use blocking plate 49B, the user hingedly opens feeder body 8B. Then the user removes the feeder body hinge barrels 116 from hinge pins 112. The user then snap-locks or otherwise assembles the blocking plate hinge barrels 116 to hinge pins 112, and hingedly closes blocking plate 49B against flange 20B. The steps are the repeated in generally the reverse order to reinstall feeder body 8B, as desired.

In the embodiments in which feeder body 8B and blocking plate 49B are simultaneously hingedly mounted to the same or separate ones of flange 20B, the cage wall, and/or other cage or feeder structures, the user hingedly opens feeder body 8B. Then, while leaving the feeder body 8B in a suspended, open, condition, the user hingedly closes blocking plate 49B. The user can then remove feeder body 8B from its mounting structure or leave it hinged open, as desired. Again, the steps are repeated in generally the reverse order to undue such procedure.

Preferably, feeder apparatus 5A and 5B are made of materials which resist corrosion, are relatively strong and/or durable and are safe for animals to be around and/or fed from. Those skilled in the art are well aware of certain metallic materials which posses such desirable qualities, and appropriate methods of forming such materials. Appropriate metallic materials include, but are not limited to, aluminum and/or stainless steel. Common industry methods of forming such metallic materials include shearing, bending, riveting, welding, extruding and others.

In preferred embodiments, feeder apparatus 5A 5B are made of various polymeric materials, which resists corrosion, are relatively strong/durable and are safe for animals to be around and/or fed from. Those skilled in the art are well aware of materials, which posses such desirable qualities, and appropriate methods of forming such materials.

Some suitable materials are various polymeric compounds, such as for example and without limitation, various of the polyolefins, such as a variety of the polyethylenes, e.g. high density polyethylene, or polypropylenes. There can also be mentioned such commodity polymers as polyvinyl chloride and chlorinated polyvinyl chloride copolymers. A wide variety of other materials, safe for contact with the living animal body, can also be used, as desired.

For any polymeric material employed in structures of the invention, any conventional additive package can be included such as, for example and without limitation, slip agents, anti-block agents, release agents, anti-oxidants, and plasticizers, to control e.g. processing of the polymeric material as well as to stabilize and/or otherwise control the properties of the finished processed product, also to control hardness, bending resistance, and the like. The suitable polymeric materials, alone or in combination with such additive packages, can be mixed in sufficient quantities to provide feeder apparatus 5A with a colored, opaque, or clear appearance as desired.

Common industry methods of forming such polymeric compounds will suffice to make feeder apparatus 5A, 5B. Exemplary, but not limiting, of such processes are the commonly-known injection molding process, cast extrusion processes, and other known polymer melt-fabrication processes.

Feeder apparatus 5A, 5B are preferably manufactured as a plurality of components. Exemplary of such components include, flanges 10A, 10B, flanges 20A, 20B, feeder bodies 8A, 8B, feed holder 40; and locks 50A, 50B.

In the alternative, one or more can be separately fabricated, and then joined to each other by known fabrication procedures, optionally formed as one or more integral, unitary, structures.

There can be mentioned, for example and without limitation, a wide variety of known joinder technologies such as chemical technologies, thermal technologies and/or mechanical technologies. Common industry methods of joining such materials, such as by using polymer adhesives, thermal bonding, and/or mechanical fasteners will suffice to join one or more of the feeder apparatus 5A, 5B components to each other.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. A feeder apparatus for mounting to a cage, comprising:
   a) mounting structure connected to said cage;
   b) a feeder body comprising a plurality of walls connected to each other and defining an inner space generally surrounded by said walls, said feeder body operatively communicating with said mounting structure and located generally outside said cage;
   c) a hinge assembly connecting said mounting structure and said feeder body; and
   d) a feed holder extending downwardly from said feeder body and slidingly housed therein;
   said hinge assembly hingedly attaching said feeder body to said mounting structure such that said feeder body hingedly actuates outside of said cage, the portion of said feed holder most proximate said cage being displaced from said cage by a distance which has a magnitude less than the magnitude of the length dimension of said feed holder.

2. The feeder apparatus of claim 1 wherein said feed holder is removably housed in said feeder body.

3. The feeder apparatus of claim 1 wherein said feeder body is selectively removable from the remainder of said feeder apparatus.

4. The feeder apparatus of claim 1 wherein at least one of said walls comprises receiving structure adapted and configured to receive a portion of said feed holder therein.

5. The feeder apparatus of claim 4 wherein said feed holder comprises at least one lateral guide extending therefrom, said lateral guide being received by said receiving structure of said at least one of said walls.

6. The feeder apparatus of claim 1, further comprising a feed holder locking mechanism, said feed holder locking mechanism communicating with each of said feeder body and said feed holder, said feed holder locking mechanism being adapted to generally restrain said feed holder relative to said feeder body, thereby to prevent unintended removal of said feed holder from said feeder body.

7. The feeder apparatus of claim 1 wherein said hinge assembly comprises first and second hinge members, said first hinge member mounted to said mounting structure and said second hinge member mounted to said feeder body.

8. The feeder apparatus of claim 7 wherein said first and second hinge members are snap lockingly connected to each other.

9. A feeder apparatus for mounting to a cage, comprising:
   a) mounting structure connected to said cage;
   b) a feeder body comprising a plurality of walls connected to each other and defining an inner space generally surrounded by said walls, said feeder body operatively communicating with said mounting structure and located generally outside said cage;
   c) a hinge assembly removably connecting said mounting structure and said feeder body and enabling said feeder body to pivotably actuate with respect to said mounting structure; and
   d) a feed holder extending downwardly from said feeder body and slidingly housed therein.

10. The feeder apparatus of claim 9 wherein said hinge assembly comprises first and second hinge members, said first hinge member mounted to said mounting structure and said second hinge member mounted to said feeder body.

11. The feeder apparatus of claim 10 wherein said first and second hinge members are snap lockingly connected to each other.

12. The feeder apparatus of claim 10 comprising a latch assembly configured to provide an interface between said mounting assembly and said feeder body.

13. The feeder apparatus of claim 12 wherein said latch assembly comprises first and second latch members, said first latch member mounted to said mounting structure and said second latch member mounted to said feeder body.

14. The feeder apparatus of claim 13 wherein said first latch member comprises a latch projection extending outwardly from said mounting structure and said second latch member comprises a latch tab which extends outwardly from an outer surface of said feeder body.

15. The feeder apparatus of claim 12 wherein said latch assembly is configured to enable a user to selectively secure said feeder body in a generally closed position in which said feeder body is positioned against said mounting structure.

16. The feeder apparatus of claim 9 wherein said mounting structure comprises a first flange having a first perimeter defining a first opening extending through said first flange, and a second flange having a second perimeter defining a second opening extending through said second flange.

17. The feeder apparatus of claim 16 wherein at least one of said first and second flanges has a protrusion extending therefrom and adapted to communicate with the other of said first and second flanges.

18. A feeder apparatus for mounting to a wall of a cage, comprising:
 a) a mounting structure connected to said wall and defining an opening therethrough;
 b) a feeder body comprising a plurality of walls connected to each other and defining an inner space generally surrounded by said walls, said feeder body operatively communicating with said mounting structure and located generally outside said cage;
 c) a hinge assembly connecting said mounting structure and said feeder body, said hinge assembly hingedly attaching said feeder body to said mounting structure such that said feeder body hingedly actuates outside of said cage; and
 d) a feed holder extending downwardly from said feeder body and slidingly housed therein.

19. The feeder apparatus of claim 18 further including a blocking plate configured to cover said opening and preventing an animal from passing therethrough.

20. The feeder apparatus of claim 19 wherein said blocking plate is removably attached to said mounting structure.

* * * * *